United States Patent
Watts, Jr.

[15] 3,683,281
[45] Aug. 8, 1972

[54] CRAB ANGLE SENSING SYSTEM

[72] Inventor: Chester B. Watts, Jr., Annandale, Va.

[73] Assignee: Scanwell Laboratories, Inc., Springfield, Va.

[22] Filed: Oct. 13, 1969

[21] Appl. No.: 865,870

[52] U.S. Cl. ............... 325/312, 325/367, 325/431, 343/114, 343/705
[51] Int. Cl. ............................................. H04b 7/08
[58] Field of Search ...... 325/312, 363, 366, 367, 368, 325/369, 430, 431, 432, 434, 435; 343/705, 116, 113, 114

[56] References Cited

UNITED STATES PATENTS

| | | | |
|---|---|---|---|
| 2,425,303 | 8/1947 | Carter | 343/705 |
| 2,603,742 | 7/1952 | Larson | 325/363 X |
| 2,821,701 | 1/1958 | Vogeleg, Jr. et al. | 343/113 X |
| 3,109,988 | 11/1963 | Hoover | 325/367 X |
| 3,523,659 | 8/1970 | Epperson, Jr. | 343/705 X |

*Primary Examiner*—Benedict V. Safourek
*Attorney*—Sandoe, Hopgood and Calimafde

[57] ABSTRACT

A six-sided antenna of substantially rectangular cross-section made up of a thin metal foil firmly attached to a base of insulating material on four of the six sides. One side of the base not covered by foil is attached to the airframe of an aircraft at approximately the plane of symmetry of the upper and lower halves of the airframe, while the other uncovered side is faced forward toward the nose. A second antenna is similarly constructed and positioned so that the two antennas may each receive signals from a ground source in order to determine crab angle. A second source, airborne, supplies equal signals to the respective antennas in order to provide a check on the accuracy of the reading from the ground source.

Signal processing circuitry, including plural modulating and demodulating elements, are employed for determining crab angle, and for verifying system operability.

5 Claims, 6 Drawing Figures

INVENTOR.
CHESTER B. WATTS, Jr.
BY
Sandoe, Hopgood & Calimafde
ATTORNEYS

INVENTOR.
CHESTER B. WATTS, JR.

BY
Sandoe, Hopgood & Calimafde
ATTORNEYS

CRAB ANGLE SENSING SYSTEM

BACKGROUND OF THE INVENTION

Crosswinds often cause considerable control problems in maintaining an aircraft on proper course direction. Those problems are especially great during landing since crosswinds often make it necessary to direct the nose of the aircraft at an angle to the end of the runway in order to bring the aircraft down properly. The angle at which the nose is pointed and for which the pilot must compensate at touchdown is called the "-crab angle," and systems for ascertaining proper crab angle for a particular intensity crosswind have been in existence for some time. See, for example, the system described in U.S. Pat. No. 2,689,345.

In crab angle sensing systems, two antennas are located on opposite sides of the frame of an aircraft, generally near the pilot's cabin. When landing an aircraft those antennas receive signals produced by a localizer transmitter situated at the end of the runway. Those signals are equal in amplitude and phase at both receiving antennas whenever the nose of the aircraft is pointed head on to the transmitter. However, should the nose be at a "crab" angle, the reception in one antenna is affected by the presence of the nose and/or some part of the fuselage between itself and the transmitting station. In addition, reception in the two antennas is different because of the slightly longer distance that the transmitted signal must travel before reception in one of the antennas. It is by measurement of the difference in amplitude and/or phase of the two received signals that a measure of the crab angle is achieved, thus enabling the pilot to maintain the proper crab angle in order to maintain proper bearing. Measurement of the crab angle also informs the pilot to just what extent he will have to swing the plane around just prior to touchdown so that the plane does not run off the edge of the runway after landing.

In order to provide an accurate crab angle measuring system, it is desirable for the polar radiating patterns of the two receiving antennas to be symmetrical and to intersect smoothly across the nose of the aircraft. Additionally, it is necessary to carefully control or eliminate, if possible, the cross polarization (vertical polarization) component in the polar radiation pattern. If these conditions are met, crab angle measurement will be nearly linear and will not vary with role attitude of the aircraft.

In the present invention the above requirements for an accurate crab angle sensing system have been met by carefully controlling the locations of the two antennas through a consideration of the airframes of various aircraft and by considering the nature of the antennas themselves. As a result there has been devised a new and novel antenna construction for location along certain planes of symmetry with respect to the airframe of the aircraft. Additionally, the system is improved through the provision of supplemental antenna probes for providing a fail-safe feature.

SUMMARY OF THE INVENTION

In this invention two antennas are located on the airframe of an aircraft as nearly as possible along planes of symmetry with respect to the left and right halves of the aircraft and also with respect to the upper and lower halves. The antennas are constructed to a flat airframe hugging design so that the antennas themselves provide a minimum alteration of the airframe symmetry, and may be easily installed with a minimum of cutting in the airframe. The system involves fail-safe protection so that the pilot is informed whenever one of the two antennas is not receiving properly and that therefore the crab angle measurement is spurious.

OBJECTS OF THE INVENTION

A general object of this invention is to provide an accurate fail-safe system for crab angle measurement.

A specific object is to provide a new and novel antenna construction that scarcely alters the silhouette and symmetry of the airframe of an aircraft, and is easily installed.

Another object is to provide antennas in locations on an airframe such that the radiated polar patterns are symmetrical and intersect in a smooth line across the nose of the aircraft.

Still another object is to provide antennas on the airframe of an aircraft such that crab angle measurement is achieved with a minimum of vertical polarization effect.

A final object is to provide supplementary and equal signals to each crab angle antenna in order to detect failures in the measuring system.

DESCRIPTION OF AN EMBODIMENT OF THE INVENTION

Figure 1:
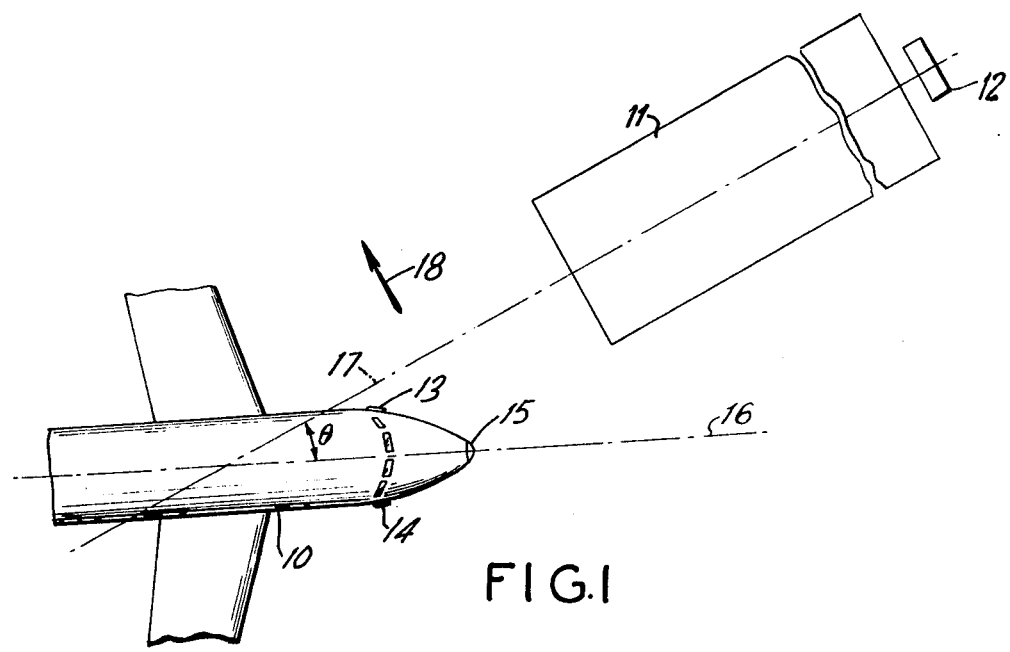
FIG. 1 illustrates the meaning of the term "crab angle" in the approach of an aircraft to a runway.

FIG. 1 provides a diagram to facilitate the understanding of the term "crab angle" in the context of an aircraft 10 making an approach to runway 11. An arrow 18 indicates the direction of a strong crosswind necessitating a counter-acting adjustment in the direction of the nose 15 in order that the aircraft fly along the proper bearing course 17. The center line of the aircraft is shown at 16 and the crab angle $\theta$ is the measurement of the angle between center line 16 and bearing line 17 giving the proper counter-acting adjustment for the crosswind.

We may observe that proper crab angle to maintain course is necessary not only to bring the aircraft to the end of the runway but also to inform the pilot how much he must swing the airplane around so that after touchdown he does not run the plane off the edge of the runway. Also note that although the diagram illustrates crab angle in relation to landing an aircraft, it is apparent that flying a course from city to city in the presence of strong crosswinds it is also necessary to maintain proper crab angle during flight. The system of this invention, therefore, may be important to cross-country flight as well as to landing.

FIG. 1 in block representation also shows a localizer transmitter 12 which provides the signal to antennas 13 and 14 shown greatly enlarged upon the airframe of the aircraft 10. It is clear that the signal received by antenna 13 will be slightly out of phase with the signal received by antenna 14 due to a difference in distance from transmitter 12. It is also clear that antenna 14 is hidden from a direct line of sight to transmitter 12 by the fuselage of the aircraft 10. As a result, there is a measureable amplitude difference between the received signal at 13 and 14; and, as stated above, it is by measuring the difference in amplitude and/or phase of the received signals that a measure of the crab angle is obtained.

Figure 2:
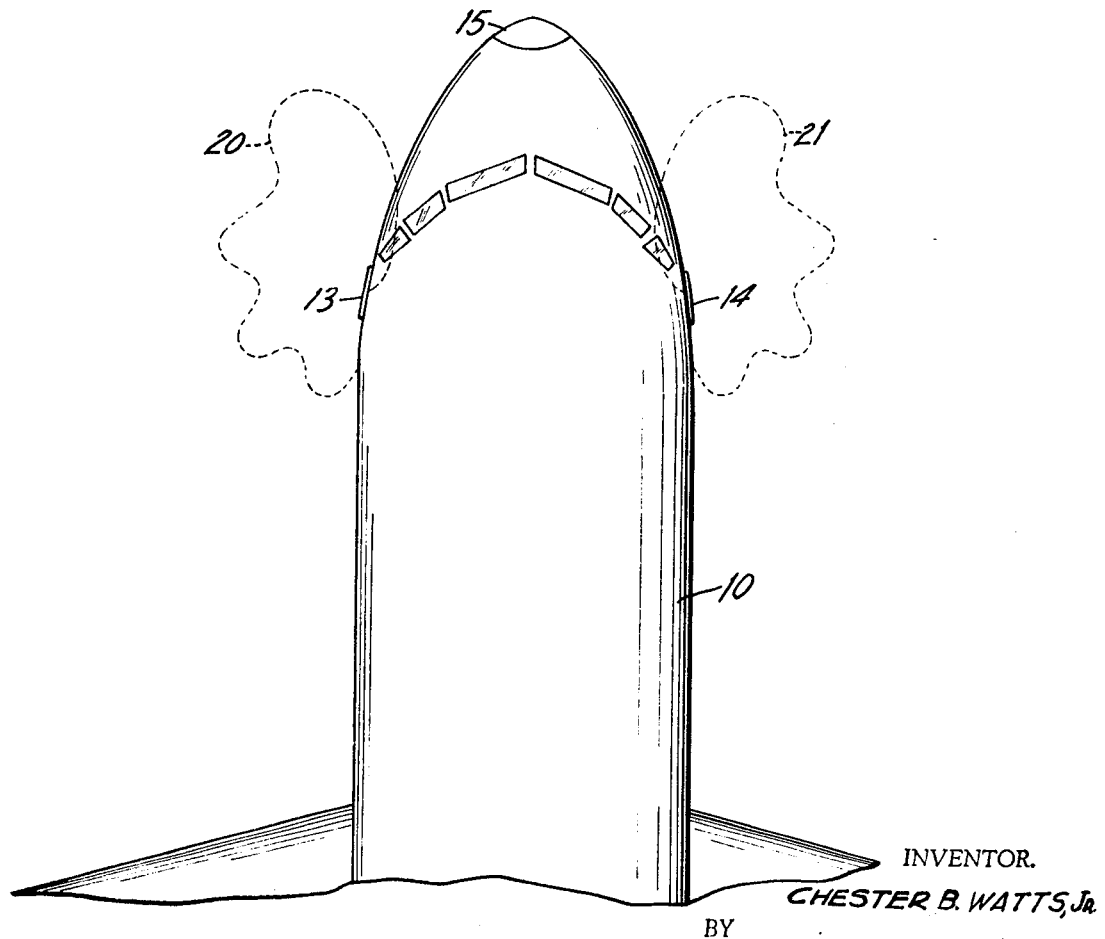
FIG. 2 is a representation of a suitable polar pattern for an airborn homer antenna providing crab angle measurement.

FIG. 2 illustrates a polar pattern 20 produced by antenna 13 and a polar pattern 21 produced by antenna 14 when each of the two antennas are energized by equal signals. It is important in crab angle measuring systems that the polar patterns be symmetrical so that the indication of changes in the relative bearing is smooth as the plane is turned from left to right, that is, as crab angle is decreased or increased the indicating needle in the pilot's cabin smoothly moves rather than jumping in steps. Symmetrical polar patterns also produce linear crossovers, that is, on a plot of the information derived from the signal reception as crab angle changes, the crossover at $\theta = 0$ is as nearly linear as possible. In that manner the pilot is provided with an easily understood indication of crab angle deviation.

In addition to symmetrical and smoothly intersecting polar patterns an accurate sensing system must be independent of the attitude of the aircraft, that is, if the antenna 13 is at any one instant higher than the antenna 14, that difference in elevation should not affect the crab angle measurement. In order to eliminate roll attitude error it is necessary to eliminate cross polarization, that is, there must be no vertical component to the polar patterns 20 and 21. Although the presence of vertical polarization is a result of several factors, one of the most important is the airframe itself.

Figure 3:
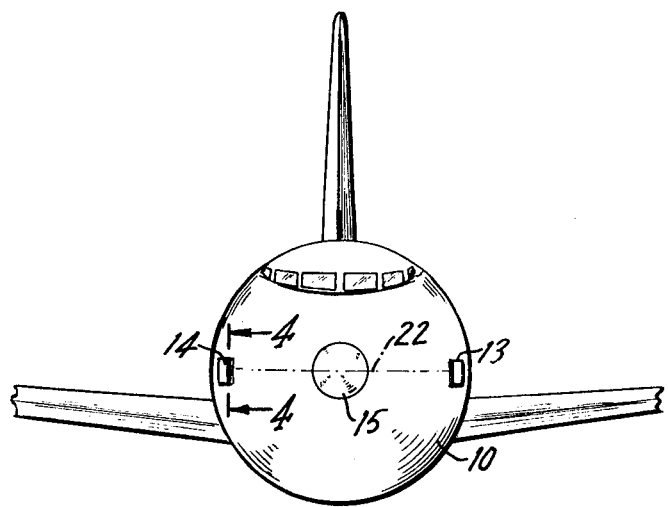
FIG. 3 shows a preferred location for antennas on the airframe of an aircraft for crab angle measurement.

It has been found that the effect of the airframe upon vertical polarization is minimized by the location of the two crab angle antennas on planes of symmetry with respect to the airframe. FIG. 3 shows a possible choice for antenna location along planes of symmetry with respect to the left and right halves of the aircraft and also with respect to the upper and lower halves. It is fortunate that most aircraft are constructed with a circular or nearly circular cross section and therefore the preferred location for the antennas would be along a horizontal plane bisecting the circular cross section of the aircraft 10. It should be observed that the location of the antenna may have to be moved slightly on particular aircraft in order to maintain its symmetry with respect to the airframes. It is important, however, that symmetry with the airframe be maintained in order to eliminate cross polarization.

The effect of the airframe on cross polarization has been found to increase when the dimensions of the airframe and wave length of the received signals are comparable. In some of the larger aircraft being constructed at the present time the diameter of the aircraft and the preferred antenna location may match or nearly match the wave length of the generally used localizer frequency, 110 megacycles per second. Hence symmetrical positioning of the crab angle antennas is especially important in those aircraft.

Figure 4:
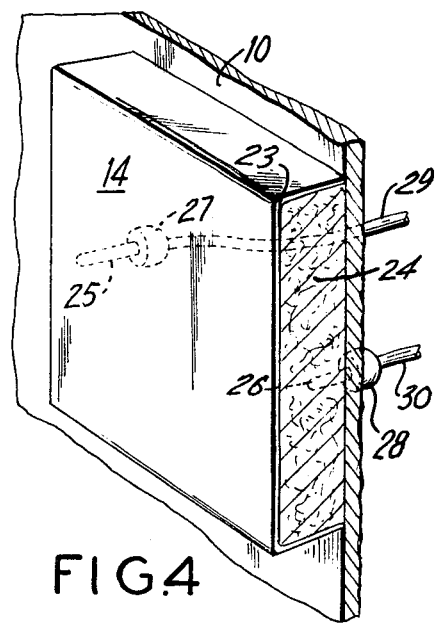
FIG. 4 is a perspective drawing of an external patch antenna located on the cutaway frame of an aircraft.

FIG. 4 shows the construction of a patch antenna 14 according to this invention. The antenna is shown externally mounted upon the airframe 10 such that only two small holes for antenna probes 25 and 26 need be cut into the airframe, when the antenna is mounted by means of an adhesive such as epoxy. The antenna patch is, of course, insulated from the airframe.

The antenna 14 is shown to be a solid of rectangular or square dimensions and rectangular cross section. The outer surfaces of the cube are completely covered with a thin metal foil 23 except for the bottom surface which is connected to the airframe and the forward surface through which the signal is received. In FIG. 4, a view of the forward surface shows that the interior of the antenna 14 is filled with an insulating material 24 which may be fiberglass or any other suitable insulating material. Connectors 27 and 28 provide means for connecting the antenna probes 25 and 26 to the cables 29 and 30.

Figure 5:
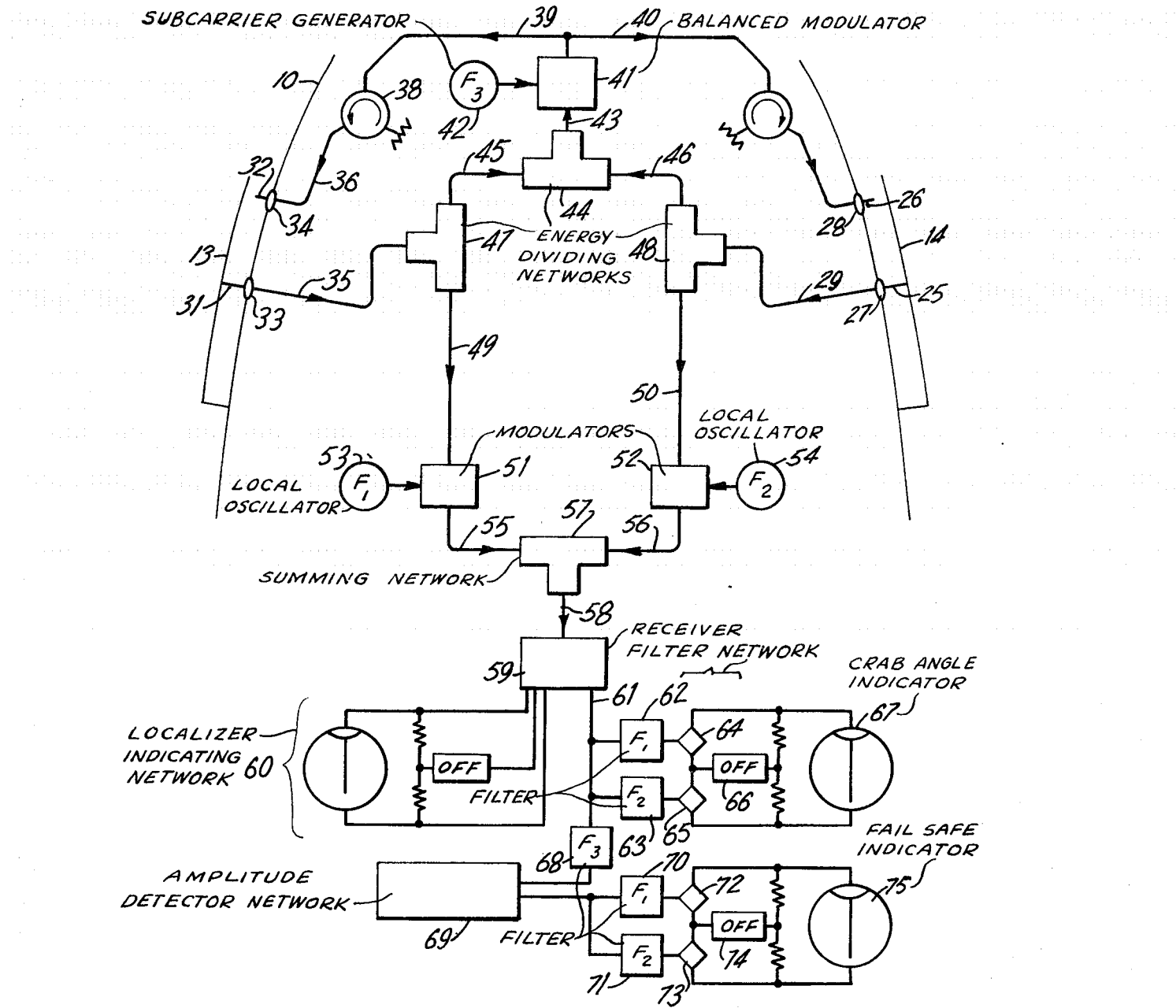
FIG. 5 is a block diagram of a signal processing circuit according to this invention.

FIG. 5 is a diagram in block form of a signal processing circuit for the crab angle sensing system. The circuit shown incorporates a fail-safe feature which informs the pilot whenever he receives a spurious crab angle measurement.

The antennas 13 and 14 are mounted upon the airframe 10 and connected to the signal processing circuits through main probes 25 and 31, connectors 27 and 33, and cables 29 and 35. Received signals are first fed to energy dividing networks 47 and 48 which feed a second energy dividing network 44 over lines 45 and 46. Network 44 feeds the balanced modulator 41 over line 43 where the signal is modulated by a subcarrier frequency $F_3$ generated by signal producing means 42. The balanced modulated signal is then sent over lines 39 and 40 to the monitor probes 26 and 32. The monitor probes are capacitavely coupled to the antennas 13 and 14 and act as a second signal radiating source (in addition to the localized generator 12 shown in FIG. 1) for the main antenna probes 25 and 31. Thus the signal received by the antennas and sent initially to the energy dividing networks 47 and 48 comprises both a basic signal received from the localizer generator and also a balanced signal sent from the auxiliary probes 26 and 32.

Networks 47 and 48 are also connected over lines 49 and 50 to modulators 51 and 52. In modulator 51 the signal received by antenna 13 is modulated by a frequency $F_1$ usually of 1 to 2 kilocycles generated by local oscillator 53. Similarly, in modulator 52 the signal received at antenna 14 is modulated by a signal $F_2$ also of 1 to 2 kilocycles and generated by local oscillator 54. The modulated signals are then sent over lines 55 and 56 to network 57 for transmittal over line 58 to the receiver 59.

It may be observed that part of the signal from receiver 59 is fed to the localizer indicator network shown generally at 60. This network will indicate to the pilot when he is flying on a line with the center of the runway; however, the present invention does not involve the localizer circuit and therefore no further description of that section of FIG. 4 is needed.

A second part of the signal is sent from the receiver 59 over line 61 to filter network 62 where $F_1$ is recovered, and to filter network 63 where $F_2$ is recovered. These signals are then passed through full wave rectifiers 64 and 65 to a zero center indicating meter 67. Whenever the received signals are of equal intensity the pointer in meter 67 will remain on zero. However should the received signal at antenna 13 be greater than the received signal at antenna 14, the voltage from circuit 64 will be slightly higher than the voltage from circuit 65 and hence the pointer of the meter 67 will move off center in an amount proportional to the voltage difference. By properly calibrating meter 67 the amount of pointer movement will give crab angle measurement.

Line 61 is also connected to a third filter network 68 where $F_3$ is recovered and sent to an amplifier detector network 69. The output of that network is fed to filter networks 70 and 71 where frequencies $F_1$ and $F_2$ are recovered. $F_1$ is fed to a full wave rectifer 72 and $F_2$ is fed to a full wave rectifer 75. Since antennas 13 and 14 should always receive equal amounts of signal $F_3$, circuits 72 and 73 should always produce equal voltages for indicating meter 75. Hence, whenever meter 75 has a reading other than zero, the pilot knows that something has gone amiss in the crab angle measuring system and that the reading he has on meter 67 is not to be trusted. For example, suppose a connection had come loose at connector 27 interrupting the reception of the signals from antenna 14. In that case, meter 67 would be indicating a large crab angle reading when conceivably it should be reading zero. Thus, by generating frequency $F_3$, applying it to the antennas, modulating it with frequencies $F_1$ and $F_2$, and recovering those frequencies in a zero indicating meter, a system is provided which prevents spurious indications of crab angle.

Circuits 66 and 74 represent a standard safety feature for showing the lack of any signal. Without these devices a zero reading on the meters 67 and 75 could not be trusted.

Figure 6:
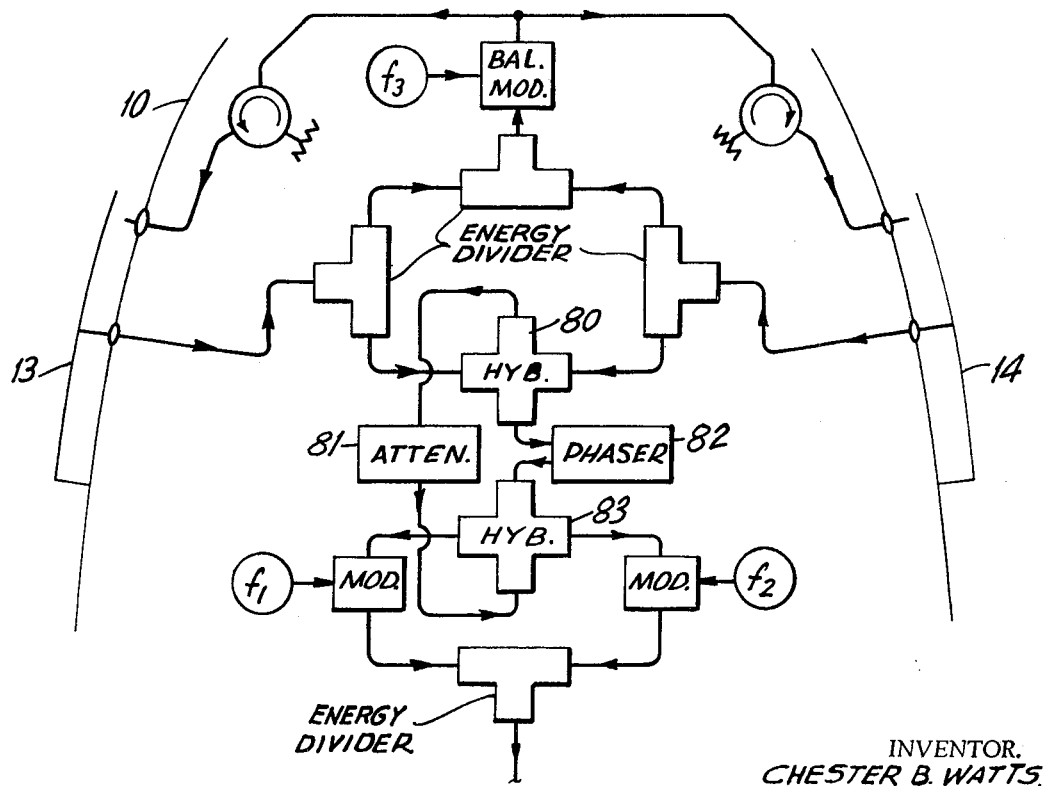

FIG. 6 shows a modification of the circuit of FIG. 5 wherein hybrid networks 80 and 83 together with an attenuator 81 and a phaser 82 are inserted to cross-couple the signals received from antennas 13 and 14. By so doing the shape of the polar patterns may be improved and a more accurate measurement at meter 67 is made possible. Cross-coupling has the effect of making the antenna elements an array.

Various modifications of the described invention may be apparent to people skilled in the art. For example, in the context of the embodiment described, more conventional types of antennas may be used and different circuit configurations may be used. Other modifications may be apparent to those skilled in the art and it is to be clearly understood that this description is made only by way of example and not as a limitation to the scope of the invention as set forth in the accompanying claims.

What is claimed is:

1. A crab angle determining signal processing circuit employing circuit operability verification means, said circuit being operable in conjunction with an incoming source signal, comprising first and second separate antennas for receiving the incoming signals, a first modulator, signal producing means for providing a modulating signal of frequency $F_3$ connected to said first modulator, means coupling the output of said first modulator to each of said two separate antennas for providing each antenna with an identical signal, second and third modulating means, a source of signal of frequency $F_1$, a source of signal of frequency $F_2$, means connecting said first antenna to said second modulating means wherein the composite received signal comprising the output of said first modulator and the received incoming signal is modulated by the signal of frequency $F_1$ generated by said source thereof, means connecting said second antenna to said third modulating means wherein the composite received signal comprising the output of said first modulator and the received incoming signal is modulated by a signal of frequency $F_2$ generated by said source thereof, a first filter circuit, first detecting means connecting said second and third modulating means to said first filter circuit wherein the frequency $F_3$ with its attendant modulation at frequency $F_1$ and $F_2$ is recovered, second detector means connected to said first filter circuit for recovering said signals of frequencies $F_1$ and $F_2$, and indicating means connected to said second detecting means for monitoring said $F_1$ and $F_2$ signals and for signaling the difference therebetween, whereby an indication of improper circuit operation is given whenever said indicating means indicates that the signals are unequal.

2. The circuit of claim 1 wherein said first modulator coupling means comprise two auxiliary probes, said two antennas each being coupled to a respective one of said auxiliary probes, said antennas each including a main antenna probe each connected to a different one of said second and third modulating means.

3. A combination as in claim 1 further comprising additional filter means connected to said first detecting means for separately recovering the modulation products of frequency $F_1$ and $F_2$ impressed on the source signal by said second and third modulating means, and indicating means responsive to the difference in amplitude between said recovered signals of frequency $F_1$ and $F_2$, to thereby determine crab angle.

4. The circuit of claim 2 wherein the two said antennas are mounted upon opposite sides of the airframe of an aircraft so that said antennas are approximately centered about a plane above and below which the airframe has symmetry and substantially disposed at a plane of vertical symmetry.

5. The circuit of claim 4 wherein the said two antennas each comprise a thin layer of metal foil and a dielectric base, said base including plural sides, said foil surrounding said base on all but two sides thereof and firmly attached thereto, one side not covered by said foil being attached to said airframe, and the other side not covered by said foil being mounted on the airframe as the forward side of the antenna.

* * * * *